US012542372B2

(12) United States Patent
Bencivenni

(10) Patent No.: US 12,542,372 B2
(45) Date of Patent: Feb. 3, 2026

(54) WAVEGUIDE TERMINATION ARRANGEMENTS FOR ARRAY ANTENNAS

(71) Applicant: GAPWAVES AB, Gothenburg (SE)

(72) Inventor: Carlo Bencivenni, Gothenburg (SE)

(73) Assignee: Gapwaves AB, Göteborg (CH)

( * ) Notice: Subject to any disclaimer, the term of this patent is extended or adjusted under 35 U.S.C. 154(b) by 46 days.

(21) Appl. No.: 18/565,898

(22) PCT Filed: May 31, 2022

(86) PCT No.: PCT/SE2022/050523
§ 371 (c)(1),
(2) Date: Nov. 30, 2023

(87) PCT Pub. No.: WO2022/255926
PCT Pub. Date: Dec. 8, 2022

(65) Prior Publication Data

US 2024/0364017 A1 Oct. 31, 2024

(30) Foreign Application Priority Data

Jun. 1, 2021 (SE) .................................. 2130148-6

(51) Int. Cl.
*H01Q 21/00* (2006.01)
*H01P 1/22* (2006.01)
(Continued)

(52) U.S. Cl.
CPC ........... *H01Q 21/005* (2013.01); *H01P 1/222* (2013.01); *H01P 1/264* (2013.01); *H01P 3/12* (2013.01);
(Continued)

(58) Field of Classification Search
CPC ........... H01Q 15/0086; H01Q 21/0043; H01Q 21/005; H01Q 21/0087; H01Q 21/0064;
(Continued)

(56) References Cited

U.S. PATENT DOCUMENTS 4,960,487 A 10/1990 Ragotin
7,038,556 B2 5/2006 An et al.
(Continued)

FOREIGN PATENT DOCUMENTS

GB 1156931 A 7/1969
WO 2020162818 A1 8/2020
WO 2022255926 A1 12/2022

OTHER PUBLICATIONS

European Search Report for Application No. EP 22816546 dated Mar. 25, 2025 (7 pages).
(Continued)

*Primary Examiner* — Robert Karacsony
(74) *Attorney, Agent, or Firm* — Barnes & Thornburg LLP

(57) ABSTRACT

An array antenna (100) having a layered configuration. The array antenna comprises a radiation layer (110) comprising a plurality of radiation elements (111) and a distribution layer (120) facing the radiation layer. The distribution layer is arranged to distribute a radio frequency, RF, signal to the plurality of radiation elements. The distribution layer comprises at least one distribution layer feed (121) and at least one first waveguide (122) arranged to guide the RF signal between at least one distribution layer feed and at least one radiation element. The array antenna further comprises at least a second waveguide (130) connected to at least one distribution layer feed (121). Any of the first (122) and the second (130) waveguides comprises plastics with a first type of surface treatment (313), where the first type of surface treatment comprising metallization. At least one radiation element is a dummy element terminated by an attenuation section, where the attenuation section is arranged on any of the waveguides (122, 130) connected to the dummy element and that comprises plastics. The attenuation section com-
(Continued)

prises a second type of surface treatment (314) arranged to attenuate the RF signal.

20 Claims, 6 Drawing Sheets

(51) Int. Cl.
*H01P 1/26* (2006.01)
*H01P 3/12* (2006.01)
*H01P 11/00* (2006.01)
*H01Q 15/00* (2006.01)
*H01Q 21/06* (2006.01)

(52) U.S. Cl.
CPC ....... *H01P 11/002* (2013.01); *H01Q 15/0086* (2013.01); *H01Q 21/0087* (2013.01); *H01Q 21/064* (2013.01)

(58) Field of Classification Search
CPC .... H01P 1/22; H01P 1/222; H01P 1/23; H01P 1/24; H01P 1/26; H01P 1/264; H01P 3/12; H01P 3/121; H01P 3/122; H01P 3/123; H01P 3/127; H01P 3/13; H01P 3/14; H01P 3/18; H01P 11/00; H01P 11/001; H01P 11/002; H01P 11/003
See application file for complete search history.

(56) References Cited

U.S. PATENT DOCUMENTS

| | | | | |
|---|---|---|---|---|
| 10,601,144 | B2 | 3/2020 | Kamo et al. | |
| 2005/0017815 | A1* | 1/2005 | Asao | H01P 1/264<br>333/22 R |
| 2018/0375185 | A1 | 12/2018 | Kirino et al. | |
| 2020/0185802 | A1 | 6/2020 | Vilenskiy et al. | |
| 2020/0194900 | A1 | 6/2020 | Doyle et al. | |
| 2020/0350699 | A1 | 11/2020 | Omuro et al. | |
| 2022/0352638 | A1* | 11/2022 | Vollbracht | H01Q 1/523 |

OTHER PUBLICATIONS

International Search Report and Written Opinion for Application No. PCT/SE2022/050523 dated Jun. 13, 2022 (9 pages).

* cited by examiner

WAVEGUIDE TERMINATION ARRANGEMENTS FOR ARRAY ANTENNAS

CROSS-REFERENCE TO RELATED APPLICATIONS

This application is a U.S. national counterpart application of International Application Serial No. PCT/SE2022/050523, filed May 31, 2022, which claims priority to and the benefit of Swedish Patent Application No. 2130148-6, filed Jun. 1, 2021, the content of each which is incorporated by reference herein in its entirety.

TECHNICAL FIELD

The present disclosure relates to antenna arrangements, particularly array antennas based on waveguides, and to waveguides in general. The antenna arrangements are suited for use in, e.g., telecommunication and radar transceivers.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. A radar transceiver is also a radio frequency transceiver since it transmits and receives radio frequency (RF) signals, i.e., electromagnetic signals.

The radiation arrangement of a transceiver often comprises an array antenna, since an array allows high control of shaping the radiation pattern, e.g., for high directivity, beam steering, and/or multiple beams. An array antenna comprises a plurality of antenna elements that commonly are spaced less than a wavelength apart, where the wavelength corresponds to the operational frequency of the transceiver.

It is desired to achieve equal individual behavior for each antenna element in an array. Behavior here means radiation pattern, impedance matching etc. It is especially desired to achieve equal individual behavior for each column of elements in an array comprising slot antennas. However, the outermost elements (or columns) present unequal performance in practice since they have less neighbors compared to an element (or column) in the middle of the array.

This can be solved by adding a new set of outermost elements and turning them into dummy elements (or dummy columns). The dummy element is internally terminated with a matched attenuator. This way, it will appear as a normal active element to the active adjacent elements.

There is a need for improved waveguide termination arrangements for array antennas.

SUMMARY

It is an object of the present disclosure to provide improved waveguide terminations for array antennas, which, i.a., is easy to manufacture with a low cost, and that present good performance.

This object is at least in part obtained by an array antenna having a layered configuration. The array antenna comprises a radiation layer comprising a plurality of radiation elements and a distribution layer facing the radiation layer. The distribution layer is arranged to distribute a radio frequency, RF, signal to the plurality of radiation elements. The distribution layer comprises at least one distribution layer feed, and at least one first waveguide arranged to guide the RF signal between at least one distribution layer feed and at least one radiation element. The array antenna further comprises at least a second waveguide connected to at least one distribution layer feed. Any of the first and the second waveguides comprises plastics with a first type of surface treatment, where the first type of surface treatment comprises metallization. Furthermore, at least one radiation element is a dummy element terminated by an attenuation section. The attenuation section is arranged on any of the waveguides connected to the dummy element and that comprises plastics. The attenuation section comprises a second type of surface treatment arranged to attenuate the RF signal.

The attenuation section is used to construct an attenuator, or get attenuation functionality, or to get termination functionality, directly integrated into an array antenna, which is advantageous. The attenuation section is further easy and cost-effective to manufacture.

According to aspects, the attenuation section is matched to a desired system impedance, such as 50 Ohms, but any value is possible. As such, the attenuation section can be used as a well-matched termination of a waveguide.

To terminate the dummy element, the attenuation section may be arranged on the radiation layer of the array antenna, but is preferably arranged in the distribution layer, or more preferably in the second waveguide connected to the distribution layer. A goal of the termination is to present the dummy element equivalently to any of the other neighboring elements.

According to aspects, the first type of surface treatment comprises a primer and metallization. The primers can be used for making the desired metal adhere better to the plastic part.

According to aspects, wherein the second type of surface treatment comprises untreated plastics i.e., the attenuation section is constituted by a section that has not been metallized. This can be accomplished with masking of the attenuation section during the metallization. Thereby, a cost-effective and simple manufacturing process is enabled.

According to aspects, the second type of surface treatment comprises a primer, i.e., the attenuation section comprises a primer and no metallization with normally desirable metals, such as copper, silver, and gold. This way, the whole waveguide comprising plastics may first be coated with a primer. Thereafter, the attenuation section may be masked off from being coated with the metallization. This provides an easy manufacturing process. The primer of the attenuation section may advantageously shield the attenuation section from the outside, e.g., adjacent waveguides. Thereby, undesired coupling may be reduced.

According to aspects, the second type of surface treatment comprises metallization, where the thickness of the metallization is arranged to attenuate the RF signal. This provides good attenuation performance. Advantageously, the coating thickness does not substantially change the surface current distribution and therefore the characteristic impedance of the waveguide. Therefore, a thin metallization of the second surface treatment results in that there is no discontinuity from the transition from the coating of the first surface treatment, which means that matching is preserved. Furthermore, the relatively thin metallization of the attenuation section may advantageously shield the attenuation section from the outside, e.g., adjacent waveguides. Thereby, undesired coupling may be reduced.

According to aspects, any of the waveguides comprising plastics comprises a lossy plastic. This advantageously attenuates unwanted signals such as any leakage from the attenuation section.

According to aspects, the at least one dummy element is arranged on the perimeter of the plurality of radiation elements. This improves the individual behavior of active antenna elements adjacent to the dummy elements in respect to the rest of the elements in the array antenna.

According to aspects, the array antenna comprises a plurality of columns of radiation elements, where at least one column is a dummy column terminated by the attenuation section. According to further aspects, the at least one dummy column is arranged on the perimeter of the plurality of columns. This improves the individual behavior of active columns adjacent to the dummy columns in respect to the rest of the columns in the array antenna.

According to aspects, the first waveguide is a gap waveguide, and any of the radiation layer and the distribution layer comprises a metamaterial structure arranged to form the gap waveguide intermediate the distribution layer and the radiation layer. The metamaterial structure is also arranged to prevent electromagnetic radiation in a frequency band of operation from propagating from the gap waveguide in directions other than through a distribution layer feed and a radiation element. The metamaterial structure efficiently seals the gap waveguide passage such that electromagnetic energy can pass more or less unhindered along the intended waveguiding path, but not in any other direction. The arrangement between the radiation layer and the distribution layer may be contactless in that no electrical contact is required between the layers. This is an advantage since high precision assembly is not necessary; the two layers may simply be attached to each other with fastening means such as bolts or the like. Furthermore, electrical contact need not be verified since the repetitive structure seals the transition in a contactless manner.

According to aspects, the metamaterial structure comprises a repetitive structure of protruding elements. The repetitive structure may, e.g., be machined directly into one of the layers. This is an advantage since such machining can be performed in a cost-effective manner with high mechanical precision. This type of integrally formed repetitive structure is also mechanically stable, which is an advantage.

There is also disclosed herein a telecommunication or radar transceiver comprising the antenna arrangement according to the discussion above.

There is also disclosed herein a waveguide for guiding a radio frequency, RF, signal, where the waveguide comprises metalized plastics. The waveguide further comprises an attenuation section), where the attenuation section comprises a second type of surface treatment and the rest of the waveguide comprises a first type of surface treatment. The first type of surface treatment comprises metallization, and the second type of surface treatment is arranged to attenuate the RF signal.

The present disclosure utilizes the surface treatment of plastics to construct an attenuator, or get attenuation functionality, or to get termination functionality, directly integrated to a waveguide, which is advantageous. According to aspects, the attenuation section is matched to a desired system impedance, such as 50 Ohms, but any value is possible. As such, the attenuation section can be used as a well-matched termination of a waveguide.

According to aspects, the waveguide comprises a first layer and a second layer facing each other. Any of the first and the second layers comprise a metamaterial structure arranged to form a gap waveguide intermediate the first and the second layers. The metamaterial structure is also arranged to prevent electromagnetic radiation in a frequency band of operation from propagating from the gap waveguide in directions other than along an intended waveguiding path.

The metamaterial structure efficiently seals the gap waveguide passage such that electromagnetic energy can pass more or less unhindered along the intended waveguiding path, but not in any other direction. The arrangement between layers may be contactless in that no electrical contact is required between the layers. This is an advantage since high precision assembly is not necessary; the two layers may simply be attached to each other with fastening means such as bolts or the like. Furthermore, electrical contact need not be verified since the repetitive structure seals the transition in a contactless manner.

According to aspects, the metamaterial structure of the waveguide comprises a repetitive structure of protruding elements. The repetitive structure may, e.g., be machined directly into one of the layers. This is an advantage since such machining can be performed in a cost-effective manner with high mechanical precision. This type of integrally formed repetitive structure is also mechanically stable, which is an advantage.

According to aspects, the first type of surface treatment of the waveguide comprises a primer.

According to aspects, the second type of surface treatment of the waveguide comprises untreated plastics. According to further aspects, the second type of surface treatment of the waveguide comprises a primer. According to other aspects, the second type of surface treatment of the waveguide comprises metallization, where the thickness of the metallization is arranged to attenuate the RF signal.

There is also disclosed herein a method for producing a waveguide comprising plastics. The method comprises:

- surface treating an attenuation section of the waveguide with a second type of surface treatment,
- surface treating the remaining part of the waveguide with a first type of surface treatment,
- wherein the first type of surface treatment comprises metallization, and the second type of surface treatment is arranged to attenuate the RF signal.

The methods disclosed herein are associated with the same advantages as discussed above in connection to the different measurement devices. There are furthermore disclosed herein control units adapted to control some of the operations described herein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1A:
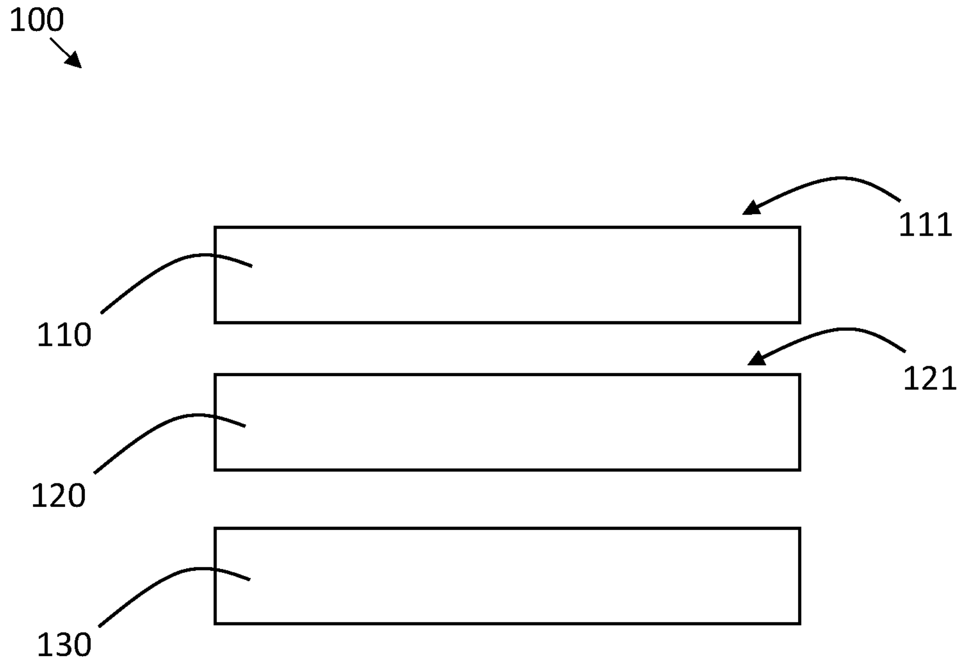
FIGS. 1A and 1B illustrate example antenna arrangements, FIG. 2 illustrate an example antenna arrangement.
Figure 1B:
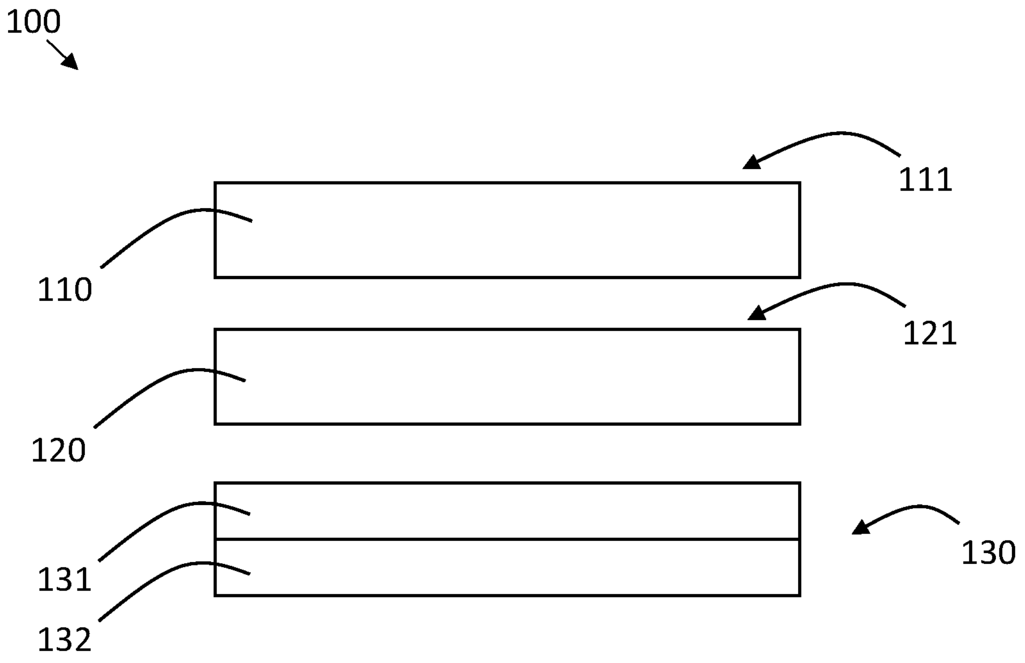

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

As mentioned, there is a need for improved waveguide termination arrangements for array antennas. For general antenna arrays, low frequencies (<6 GHZ) can be terminated easily, e.g., using a PCB with surface mounted attenuators or coaxial terminations. For waveguide-based arrays, electromagnetic absorbers can be used. This can be done using many different materials and in many different ways, such as using a wedge-formed absorber at the end of a shorted waveguide. Using absorbers, however, is expensive and complicates the manufacturing of the array antenna significantly. Furthermore, it may be challenging to use absorbers with enough attenuation since space becomes limited. Manufacturing tolerances can also present a problem for absorbers, especially at high frequencies, e.g., at mm-waves.

The present disclosure utilizes the surface treatment of plastics to construct an attenuator, or get attenuation functionality, or to get termination functionality, directly integrated into an array antenna. More specifically, the antenna, a waveguide part of the antenna, or a waveguide in general comprises metalized plastics and a section, from here on called attenuation section, with a different surface treatment compared to the rest of the antenna, the waveguide part of the antenna, or the waveguide in general. For example, the attenuation section can simply be a section with no metallization at all or be a section with only a primer. A different example is that the attenuation section is metalized with a different material. Another example is that the attenuation section is metalized in a way that that the corresponding metal coating is thinner. In general, the attenuation section is arranged to attenuate the RF signal by ohmic losses.

According to aspects, the attenuation section is matched to a desired system impedance, such as 50 Ohms, but any value is possible. As such, the attenuation section can be used as a well-matched termination of a waveguide.

The disclosed attenuation section of a waveguide can be used to terminate a radiation element in an array antenna, thereby making it into a dummy element. It can also be used to terminate a whole column, thereby making it into a dummy column. To terminate the dummy element, the attenuation section may be arranged directly on a radiation layer of the array antenna, but is preferably arranged in a distribution layer, or more preferably in a waveguide connected to the distribution layer. A goal of the termination is to present the dummy element equivalently to any of the other neighboring elements.

According to an aspect of the invention, there is herein disclosed an array antenna 100 having a layered configuration, as is shown in the examples of FIGS. 1A, 1B, 2, 3A, and 3B. The array antenna comprises a radiation layer 110 comprising a plurality of radiation elements 111 and a distribution layer 120 facing the radiation layer. The distribution layer is arranged to distribute a radio frequency, RF, signal to the plurality of radiation elements 111. The distribution layer comprises at least one distribution layer feed 121, and at least one first waveguide 122 arranged to guide the RF signal between at least one distribution layer feed and at least one radiation element. The array antenna further comprises at least a second waveguide 130 connected to at least one distribution layer feed 121. Any of the first 122 and the second 130 waveguides comprises plastics with a first type of surface treatment 313. In other words, one or both of the first and second waveguides comprise the first type of surface treatment. Here, the first type of surface treatment comprises metallization. At least one radiation element is a dummy element terminated by an attenuation section 312. The attenuation section is arranged on any of the waveguides 122, 130 connected to the dummy element and that comprises plastics. Preferably, the waveguide with the attenuation section is a hollow waveguide, which can be filled or air or some dielectric material. Examples of such waveguides are rectangular waveguides, circular waveguides, ridge waveguides, gap waveguides, ridge gap waveguides. The first waveguide of the distribution layer may utilize a part of the radiation layer to confine the electromagnetic wave. For example, a part of the radiation layer may constitute one of the waveguide walls in a rectangular waveguide. Furthermore, the first waveguide may be a ridge waveguide where one or more ridges are arranged on the distribution layer and/or on the radiation layer. Furthermore, the attenuation section comprises a second type of surface treatment 314 arranged to attenuate the RF signal.

The disclosed array antenna is very cost effective since there is no need for additional components such as surface mounted attenuators or electromagnetic absorbers. The array antenna is also easy to manufacture, which further saves costs in many ways. Furthermore, the disclosed array enables excellent performance at high frequencies, e.g., at millimeter waves.

Figure 4A:
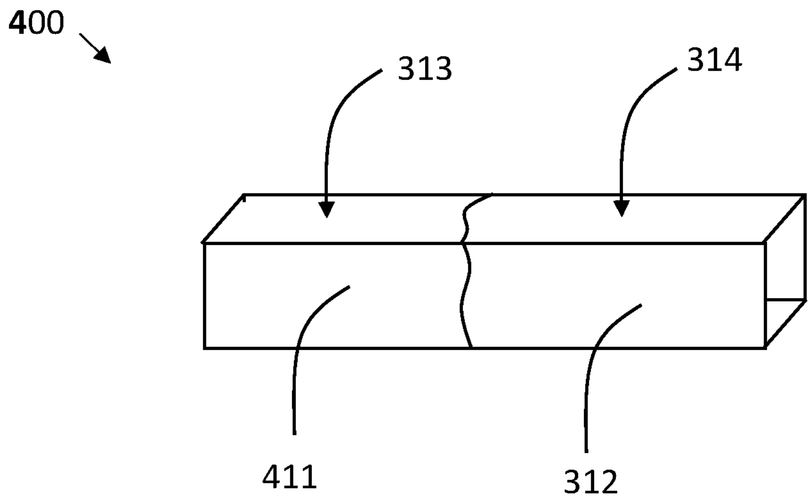
FIGS. 4A and 4B illustrate example waveguides.
Figure 4B:
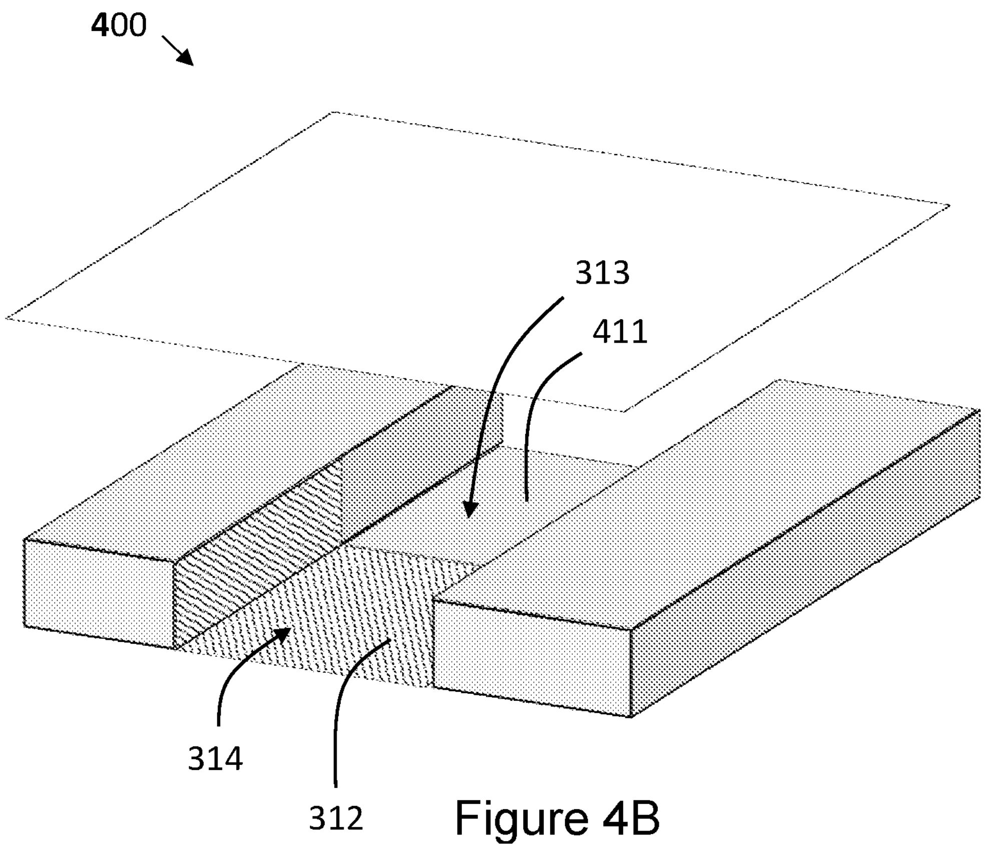
Figure 5A:
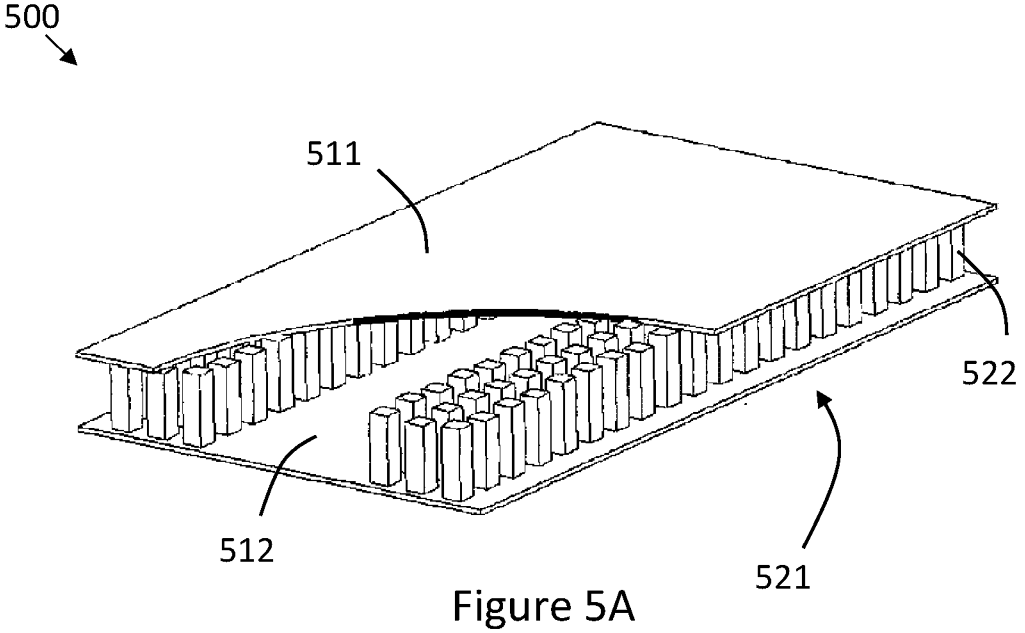
FIGS. 5A and 5B illustrate example waveguides.
Figure 5B:
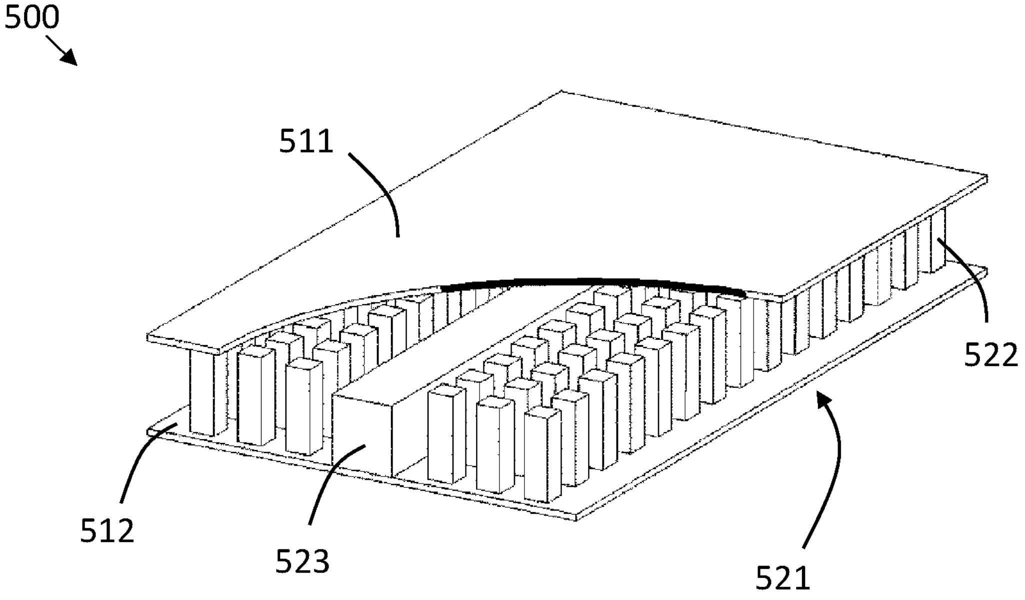

In general, a waveguide herein is a structure that guides electromagnetic waves. A waveguide can be a hollow rectangular tube, as is shown in FIGS. 4A and 4B. The cross section can have many other shapes, such as circular or more general shapes. The tube can be hollow or filled with a dielectric material. A waveguide may also be a gap waveguide.

A layer is planar element with two sides, or faces, and is associated with a thickness. The thickness is much smaller than the dimension of the faces, i.e., the layer is a flat or approximately planar element, i.e., as in an arcuate shape. According to some aspects, a layer is rectangular or square. However, more general shapes are also applicable, including circular or elliptical disc shapes.

Figure 2:
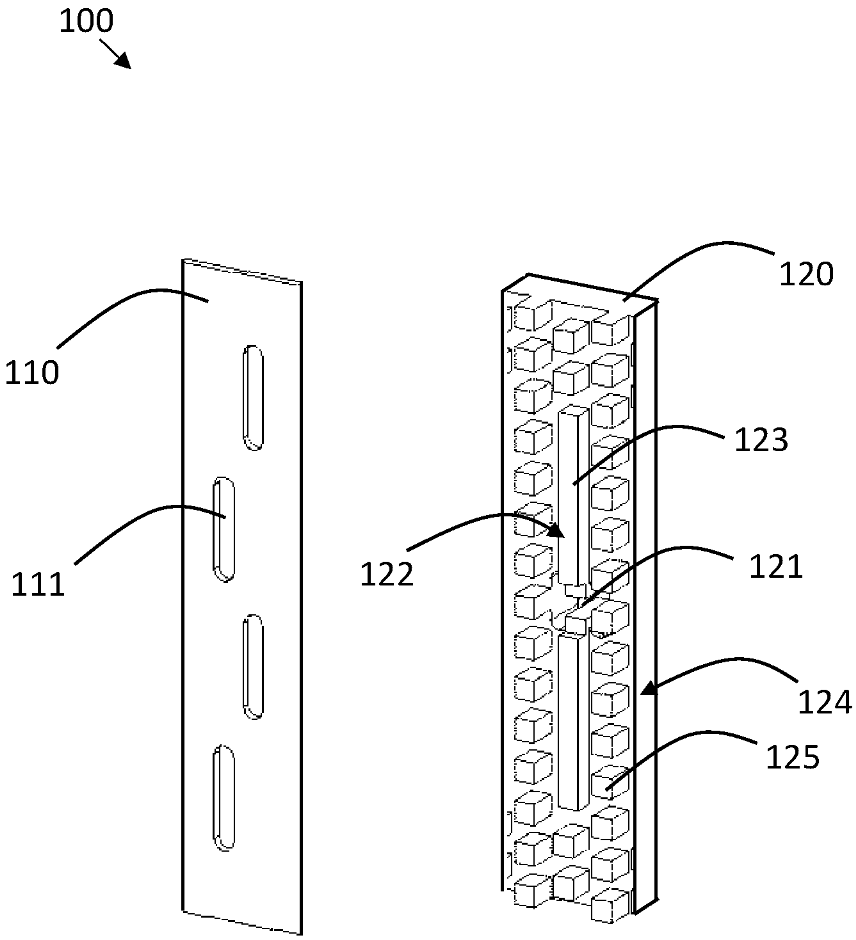
Figure 3A:
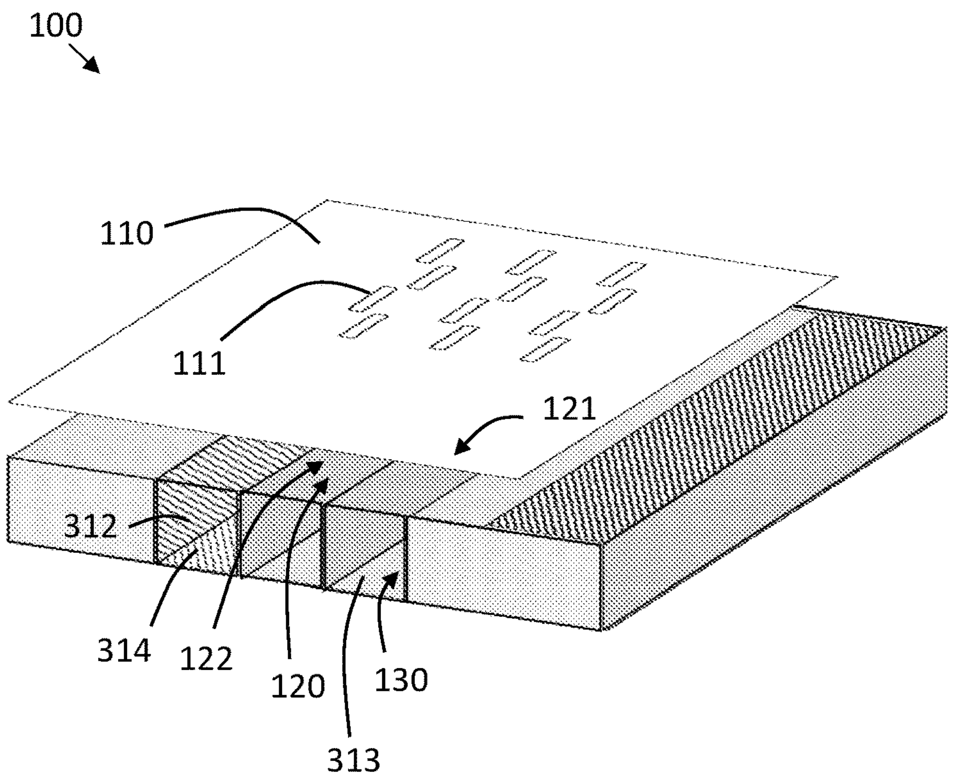
FIGS. 3A and 3B illustrate example antenna arrangements.
Figure 3B:
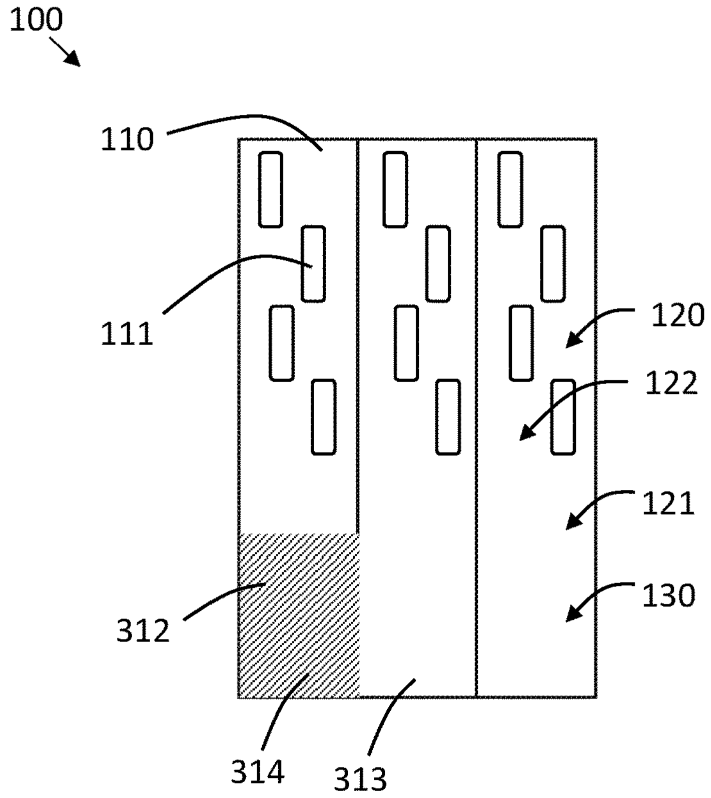

The at least one distribution layer feed 121 may be a waveguide arranged as through hole arranged to transfer radio frequency signals through the distribution layer, as is shown in FIG. 2. A distribution layer feed can also comprise an extension of the first waveguide 122 to route the RF signal off from the distribution layer, as is shown in FIGS. 3A and 3B.

Referring to the FIG. 2, the attenuation section may be arranged on the ridge gap waveguide 122 of the distribution layer. The attenuation section can also be arranged on waveguide connected to the distribution layer feed (not shown). This way, all elements in the figure would be terminated with good matching. Such column would be useful as a dummy column in an array antenna comprising a plurality of columns. Referring to the FIGS. 3A and 3B, the attenuation section is arranged on the second waveguide 130 of the left most column in the array of three columns.

The radiation layer and/or the first 122 or the second 130 waveguide not comprising plastics may comprise metal, such as copper or brass, that has been casted, molded, punched and/or machined. The metal may comprise a coating with high electrical conductivity, e.g., aluminum coated with silver or copper or zinc coated with silver or copper.

Any of the first 122 and the second 130 waveguides comprises plastics with a first type of surface treatment 313, where the first type of surface treatment comprises metallization. A purpose of the metallization is to allow electromagnetic waves to propagate through the waveguide, which enables a functioning array antenna. Metallization is known in general and is therefore only discussed briefly herein. The radiation layer may also comprise metalized plastics. Metallization of plastics can be done in many different ways. Plastics can be metalized directly, or a primer can first be applied onto a plastic surface before the plastic surface is coated with a desirable metal. Desirable metals for the metallization of plastics have low loss and high electrical conductivity, e.g., copper, silver, and gold. Many other metals and alloys are also possible. Metallization herein is interpreted broadly. The metallization can include arranging a conductive polymer on the surface. Such materials have a desired metallic conductivity and are therefore included in the term metallization.

Examples of suitable primers are nickel, chromium, palladium, and titanium, although many other materials are also possible. The primers can be used for making the desired metal adhere better to the plastic part. There are many different ways of forming the plastic surface into the desired shape, such as casted, molded, and/or machined. Plastics is herein interpreted broadly as a wide range of synthetic or semi-synthetic organic compounds that can be molded into solid objects.

At least one in the plurality of radiation elements 111 in the disclosed antenna arrangement 100 may comprise an aperture. An aperture of the radiation layer 110 may for example be a slot opening extending through the radiation layer. The slot opening is preferably rectangular, although other shapes such as square, round, or more general shapes are also possible. The slot openings are preferably small compared to the size of the radiation layer 110 and arranged in parallel lines on the radiation layer, although other arrangements are possible. If all radiation elements comprise slots, the radiation layer 110 may, e.g., comprise a metal sheet (of e.g., copper or brass). The radiation layer may comprise a sublayer of cavities arranged to form a respective cavity between respective radiation element and the distribution layer. It is understood that other types of radiation elements are also possible.

The second waveguide can be connected to at least one distribution layer feed 121 in many different ways. For example, it may simply comprise a rectangular waveguide connected directly to a distribution layer feed. Example waveguides are shown in FIGS. 4A and 4B. Furthermore, the second waveguide 130 may be arranged in a layer facing the distribution layer 120, such as a printed circuit board, PCB, layer 131 and/or a shield layer 132, or any other type of distributing/feeding layer.

The radiation layer may be formed as a separate part from the distribution layer, as is shown in FIG. 2. However, the radiation layer and distribution layer may be integrally formed in a single part. Similarly, the second waveguide may be separate from or integrally formed with the distribution layer feed. FIGS. 3A and 3B show examples where the second waveguide is integrally formed with the distribution layer feed.

According to aspects, the first type of surface treatment 313 comprises a primer. In other words, the metallization of the first type of surface treatment involves a step of arranging a primer before metallizing with a desired metal.

The second type of surface treatment 314 may comprise untreated plastics, i.e., the attenuation section is constituted by a section that has not been metallized. This way, the attenuation section may be masked off from being coated with the metallization (and eventual primers). This provides an easy manufacturing process. The surface treatment process of the antenna arrangement may be carried out according to the following step. The parts with the second surface treatment are masked off and the parts with the first surface treatment are coated with the desired thickness of metallization. Here, the optional primer may be coated onto the parts before the metallization. This process only comprises masking once, which is an advantage since the process is simple and accurate.

According to aspects, the second type of surface treatment 314 comprises a primer, i.e., the attenuation section comprises a primer and no metallization with normally desirable metals, such as copper, silver, and gold. This way, the whole waveguide comprising plastics may first be coated with a primer. Thereafter, the attenuation section may be masked off from being coated with the metallization. This provides an easy manufacturing process. The primer of the attenuation section may advantageously shield the attenuation section from the outside, e.g., adjacent waveguides. Thereby, undesired coupling may be reduced. The surface treatment process of the antenna arrangement may be carried out according to the following steps. First, the primer is coated on all parts with the first and second surface treatments. Finally, the parts with the second surface treatment are masked off and the parts with the first surface treatment are coated with the desired thickness of metallization. This process only comprises masking once.

The second type of surface treatment 314 may comprise metallization. In that case, the thickness of the metallization is arranged to attenuate the RF signal. The relatively thin metallization of the attenuation section may advantageously shield the attenuation section from the outside, e.g., adjacent waveguides. Thereby, undesired coupling may be reduced. The surface treatment process of the antenna arrangement may be carried out according to the following steps. First, the optional primer may be coated on all parts with the first and second surface treatments. Second, a thin layer of metallization is coated on all parts. Finally, the parts with the second surface treatment are masked off and the parts with the first surface treatment are coated with the desired thickness of metallization. This process only comprises masking once.

According to aspects, any of the first surface treatment and second surface treatment may comprise a protective coating. This protective coating may be used for corrosion protection or protection from mechanical wear or such. Furthermore, any of the coating steps described herein may comprise the application of a plurality of layers. For example, the coating of the primer may comprise the application of several layers.

As mentioned, the second type of surface treatment 314 may comprise a thin layer of metallization arranged to attenuate the RF signal. Here, the attenuation section has a surface coated with one (or more) thin layer of metallization on top of plastics. The thickness arranged to attenuate the RF signal is related to the so called skin depth. The skin depth describes how deep the electrical field propagates in the material and is dependent on frequency and material proprieties (the higher the frequency the more the field is contained on the surface). When there is no magnetic or dielectric loss, the skin depth can be expressed as $$\delta = \sqrt{\frac{2\rho}{\omega\mu}}\sqrt{\sqrt{1+(\rho\omega\epsilon)^2}+\rho\omega\epsilon},$$

where ρ is the resistivity of the conductor, ω is the angular frequency, μ is the permeability of the conductor, and ∈ is the permittivity of the conductor.

In a conventional waveguide, where low losses are desired, the metal (or electrically conductive material) should be relative thick, which means a thickness several times larger than the skin depth. The attenuation section may instead comprise a thin metal coating to present high losses to provide an excellent termination. According to aspects, the thickness of the metallization arranged to attenuate the RF signal is less than three times the skin depth, preferably less than skin depth, and more preferably less than a third of the skin depth.

The losses introduced by the thin thickness can be used in conjunction with materials with poor electrical conductivity.

If the metalized coating has a thickness comparable to or smaller than the skin depth, the electrical field will penetrate through the entire metallized coating and currents will be present also on the opposite side of the coating (i.e., the plastic side) which can potentially radiate electromagnetic waves. Such radiation is a type of leakage, which may be undesired. However, such leakage could be suppressed by external means. While leakage may reduce the power of electromagnetic waves traveling along the attenuation section, ohmic losses typically attenuate the waves more significantly. Furthermore, it may be desired not to have the metallization of the attenuation section too thin, since the metalized coating provides some shielding from, e.g., adjacent waveguides or self-interference from leakage. Thus there exists a range of thickness that are thin enough to provide sufficient attenuation and does not suffer from adverse leakage or shielding problems.

Advantageously, the coating thickness does not substantially change the surface current distribution and therefore the characteristic impedance. This results in that there is no discontinuity from the normal coating, which means that matching is preserved.

The attenuation section may comprise a poor conductor with a normal thickness, i.e., several times the skin depth. In this case, there will be no issues with shielding or leakage.

As mentioned, the second surface treatment may be untreated plastics, i.e., no coating. This may present some reflections at the transition from the first surface treatment into the second surface treatment. However, matching could be improved by gradual transition of the two surface treatments and/or by a gradual change in the geometry of the waveguide. The geometry may be changed by flaring, as in a horn. This could be seen as providing an antenna with the purpose of attenuating power. Furthermore, any of the waveguides 122, 130 comprising plastics may comprise a lossy plastic. This way, unwanted leakage is attenuated. It is particularly advantageous to have lossy plastics in the waveguide comprising the attenuation section. Lossy plastic may, e.g., comprise a material with high dielectric losses and/or be doped with carbon or the like.

The at least one dummy element may be arranged on the perimeter of the plurality of radiation elements 111. In other words, the dummy element is arranged in connection to a surface boundary of the radiation layer. According to aspects, all elements on the perimeter are dummy elements. In that case, all active elements are surrounded by dummy elements. Here, to surround means to form a perimeter around the surrounded object.

The array antenna 100 may comprise a plurality of columns of radiation elements 111. In that case, at least one column is a dummy column terminated by the attenuation section. In some cases, it is only necessary to arrange dummy elements along the two outermost columns in an array antenna to achieve the desired effect of having all active elements in the array behave equally. This can be the case in an array comprising slot antennas. Therefore, the at least one dummy column may be arranged on the perimeter of the plurality of columns.

According to aspects, the first waveguide is a gap waveguide, and any of the radiation layer 110 and the distribution layer 120 comprises a metamaterial structure 124 arranged to form the gap waveguide intermediate the distribution layer 120 and the radiation layer 110. The metamaterial structure is also arranged to prevent electromagnetic radiation in a frequency band of operation from propagating from the gap waveguide in directions other than through a distribution layer feed 121 and a radiation element 111.

With the metamaterial structure, the distribution layer 120 is arranged with direct contact to the radiation layer 100 or is arranged at a distance from the radiation layer 110, where the distance is smaller than a quarter of a wavelength of center frequency of operation of the antenna arrangement 100. Direct contact can mean that only sections of the two layers are in contact.

The use of metamaterial structures in the distribution layer provides low losses from the waveguides as well as low interference between radio frequency signals in adjacent waveguides. A consequence of this is that a higher signal to noise ratio can be maintained due to the use and placement of metamaterial structures in the distribution layer, which is advantageous. Another advantage is that there is no need for electrical contact between the two layers constituting the waveguide. This is an advantage since high precision assembly is not necessary since electrical contact need not be verified. Electrical contact between the layers is, however, also an option.

The metamaterial structure is arranged to form a high-impedance surface, such as an artificial magnetic conductor (AMC). If the high-impedance faces an electrically conductive surface (i.e., a low-impedance surface such as a perfect electric conductor, PEC, in the ideal case), and if the two surfaces are arranged at a distance apart less than a quarter of a wavelength at a center frequency, no electromagnetic waves in a frequency band of operation can, in the ideal case, propagate along or between the intermediate surfaces since all parallel plate modes are cut-off in that frequency band. In other words, the high-impedance surface and the low-impedance surface form an electromagnetic bandgap between the two surfaces. The two surfaces may also be arranged directly adjacent to each other, i.e., electrically connected to each other. The center frequency is often in the middle of the frequency band of operation. In a realistic scenario, the electromagnetic waves in the frequency band of operation are attenuated per length along the intermediate surfaces. Herein, to attenuate is interpreted as to significantly reduce an amplitude or power of electromagnetic radiation, such as a radio frequency signal. The attenuation is preferably complete, in which case attenuate and block are equivalent, but it is appreciated that such complete attenuation is not always possible to achieve The metamaterial structure may replace the walls of a waveguide to form a gap waveguide. Such waveguide may comprise a ridge to form a ridge gap waveguide (RGW).

Example dimensions of a rectangular distribution layer 120 are a thickness of 5 mm and sides 100 mm and 100 mm. The distribution layer is, however, not necessarily rectangular—other shapes are also possible, such as circular or hexagonal.

The metamaterial structure 124 may comprise a repetitive structure of protruding elements 125. Such protruding elements may be monolithically formed on the layer 110, 120 comprising the metamaterial structure 124, i.e., on the radiation layer 110 and/or on the distribution layer 120. Any of the distribution layer 120 and the radiation layer 110 optionally comprises at least one waveguide ridge 123, forming at least one first gap waveguide.

As mentioned, the second waveguide 130 may be arranged on printed circuit board, PCB, layer 131 facing the distribution layer 120 and/or on a shield layer 132 facing the PCB layer 131. As such, the antenna arrangement 100 may further comprise a printed circuit board, PCB, layer 131 facing the distribution layer 120, wherein the PCB layer comprises at least one PCB layer feed.

The use of metamaterial structures in the distribution layer enables highly efficient coupling at the transitions from the PCB layer feeds on the PCB layer 131 through distribution feeds 224 to the at least one first waveguide, which results in low loss. The PCB layer 131 optionally comprises at least one RF integrated circuit (IC) arranged on either or both sides of the PCB layer. The at least one PCB layer feed may be arranged to transfer radio frequency signals from the RF IC(s) to an opposite side of the PCB, into the distribution layer. According to an example, the at least one PCB layer feed is a through hole connected to a corresponding opening in the distribution layer 120, wherein the through hole is fed by at least one microstrip line. Alternatively, or in combination of, the at least one PCB layer feed may be arranged to transfer radio frequency signals from RF IC(s) on the side of the PCB facing the distribution layer into the distribution layer. According to aspects, at least one PCB layer feed is arranged to transfer radio frequency signals away the antenna arrangement 100, to, e.g., a modem. The PCB layer may comprise a stamped or etched metal plate as a ground plane or as a complimentary ground plane.

The antenna arrangement 100 may further comprise a shield layer 132 facing the PCB layer 131. The shield layer 132 optionally comprises a second metamaterial structure arranged to form a gap waveguide intermediate the shield layer 132 and the PCB layer 131. This gap waveguide may constitute the second waveguide 130. The second metamaterial structure is also arranged to prevent electromagnetic radiation in a frequency band of operation from propagating from the gap waveguide in directions other than through the at least one PCB layer feed. The second metamaterial structure allows a compact design with low loss and low leakage, i.e., unwanted electromagnetic propagation between, e.g., adjacent waveguides or between adjacent RFICs. Furthermore, the second metamaterial structure shields the PCB layer from electromagnetic radiation outside of the antenna arrangement.

The second metamaterial structure optionally comprises a repetitive structure of protruding elements, and the PCB layer optionally comprises a ground plane and at least one planar transmission line, forming the at least one gap waveguide intermediate the shield layer 132 and the PCB layer 131. The gap waveguide may, e.g., be an inverted microstrip gap waveguide. The gap waveguide may be the second waveguide 130. The shield layer may comprise two types of protruding elements. For example, narrow tall pins and wide short pins. The wider and shorter pins can be adapted to fit RFICs between the shield layer and the PCB layer. The pins may contact RFICs for heat transfer purposes.

According to aspects, the distribution layer 120 comprises a third metamaterial structure, which is arranged on the opposite side of the first metamaterial structure 124, i.e., the third metamaterial structure faces the PCB layer 131. This way, gap waveguides may be formed intermediate the distribution layer 120 and the PCB layer 131. These gap waveguides may be used for coupling electromagnetic signals between RFICs on the PCB layer 131 and the PCB layer feeds. Any such gap waveguide may constitute the second waveguide 130. The third metamaterial structure allows a compact design with low loss and low leakage, i.e., unwanted electromagnetic propagation between, e.g., adjacent waveguides or between adjacent RFICs. Furthermore, the third metamaterial structure shields the PCB layer from electromagnetic radiation outside of the antenna arrangement.

According to aspects, a telecommunication or radar transceiver comprises the antenna arrangement 100.

There is also disclosed herein a method for producing an array antenna (100) having a layered configuration. The method comprises:

providing a radiation layer 110 comprising a plurality of radiation elements 111;

arranging a distribution layer 120 to face the radiation layer, wherein the distribution layer is arranged to distribute a radio frequency, RF, signal to the plurality of radiation elements 111, the distribution layer comprising at least one distribution layer feed 121, and at least one first waveguide 122 arranged to guide the RF signal between at least one distribution layer feed and at least one radiation element; and arranging at least a second waveguide 130 to be connected to at least one distribution layer feed 121, wherein any of the first 122 and the second 130 waveguides comprises plastics, and the method further comprising surface treating the waveguide comprising plastics with a first type of surface treatment 313, the first type of surface treatment comprises metallization, wherein at least one radiation element is a dummy element terminated by an attenuation section 312, the method further comprising arranging an attenuation section on any of the waveguides 122, 130 that is connected the dummy element and that comprises plastics, wherein the attenuation section comprises a second type of surface treatment 314 arranged to attenuate the RF signal.

There is also disclosed herein a waveguide 300, 400 for guiding a radio frequency, RF, signal, where the waveguide comprises metalized plastics. The waveguide further comprises an attenuation section 312. The attenuation section comprises a second type of surface treatment 314 and the rest of the waveguide comprises a first type of surface treatment 313. The first type of surface treatment comprises metallization, and the second type of surface treatment is arranged to attenuate the RF signal.

The disclosed waveguide 300, 400 may be any of a rectangular waveguide, circular waveguide, a waveguide based on metamaterial structures, such as repetitive prostituting pins. Many other types of waveguides are also possible. FIGS. 4A, 4B, 5A, and 5B show different examples of the disclosed waveguide.

According to aspects, the waveguide 300, 400 comprises a first layer 511 and a second layer 512 facing each other. Any of the first and the second layers comprise a metamaterial structure 521 arranged to form a gap waveguide intermediate the first 511 and the second 512 layers. The metamaterial structure is also arranged to prevent electromagnetic radiation in a frequency band of operation from propagating from the gap waveguide in directions other than along an intended waveguiding path.

The intended waveguiding path is the path which the waveguide is intended to guide the electromagnetic radiation. For example, a microwave device comprising two separate waveguides, wherein it is intended that the two waveguides are isolated, then the intended waveguiding path is along the respective waveguides. The metamaterial structure 521 provides the isolation between the two waveguides. Other examples of the intended waveguiding path are a corporate feeding network, a waveguide connecting a distribution feed and a radiation element, and a waveguide connecting different integrated components on a PCB.

With the metamaterial structure, the first 511 and the second 512 layers are arranged with direct contact with each other or are arranged at a distance from each other, where the distance is smaller than a quarter of a wavelength of center frequency of operation of the disclosed waveguide 300, 400. Direct contact can mean that only sections of the two layers are in contact.

The use of metamaterial structures in the any of the first 511 and the second 512 layers provides low losses from the waveguides as well as low interference between radio frequency signals in adjacent waveguides or circuits. An advantage is that there is no need for electrical contact between the two layers constituting the waveguide. This is an advantage since high precision assembly is not necessary since electrical contact need not be verified. Electrical contact between the layers is, however, also an option.

The metamaterial structure 521 of the waveguide 300, 400 may comprise a repetitive structure of protruding elements 522. Such protruding elements may be monolithically formed on the layer 511, 512 comprising the metamaterial structure 521. Any of the first 511 and the second 512 layers optionally comprises at least one waveguide ridge 523, forming at least one first gap waveguide intermediate the first 511 and the second 512 layers.

The first type of surface treatment 313 of the waveguide 300, 400 may comprise a primer. In other words, the metallization of the first type of surface treatment involves a step of arranging a primer before metallizing with a desired metal.

The second type of surface treatment 314 of the waveguide 300, 400 may comprise untreated plastics, i.e., the attenuation section is constituted by untreated plastic.

According to aspects, the second type of surface treatment 314 of the waveguide 300, 400 may comprise a primer, i.e., the attenuation section comprises a primer and no metallization with normally desirable metals, such as copper, silver, and gold.

The second type of surface treatment 314 of the waveguide 300, 400 may comprise metallization. In that case, the thickness of the metallization is arranged to attenuate the RF signal.

Figure 6:
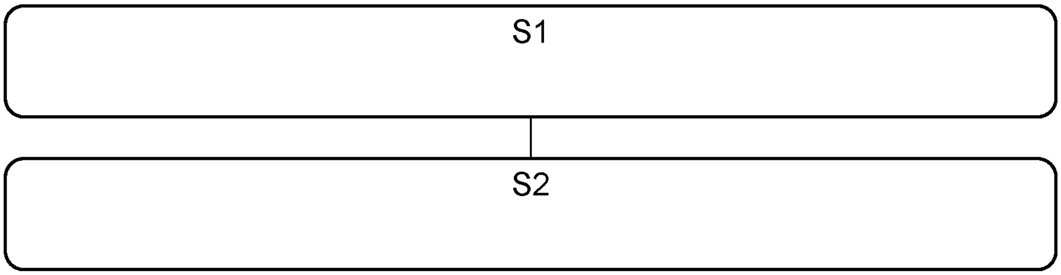
FIG. 6 is a flow chart illustrating methods.

There is also disclosed herein a method for producing a waveguide 300, 400 comprising plastics, as is shown in FIG. 6. The method comprises:

surface treating S1 an attenuation section 312 of the waveguide with a second type of surface treatment 314, surface treating S2 the remaining part 411 of the waveguide with a first type of surface treatment 313, wherein the first type of surface treatment comprises metallization, and the second type of surface treatment is arranged to attenuate the RF signal.

What is claimed is:

1. An array antenna having a layered configuration comprising:

a radiation layer comprising a plurality of radiation elements;

a distribution layer facing the radiation layer, wherein the distribution layer is arranged to distribute a radio frequency, RF, signal to the plurality of radiation elements, the distribution layer comprising at least one distribution layer feed, and at least one first waveguide arranged to guide the RF signal between at least one distribution layer feed and at least one radiation element; and at least a second waveguide connected to at least one distribution layer feed, wherein any of the first and the second waveguides comprises plastics with a first type of surface treatment, the first type of surface treatment comprises metallization, wherein at least one radiation element is a dummy element terminated by an attenuation section, the attenuation section arranged on any of the waveguides that is connected to the dummy element and that comprises plastics, wherein the attenuation section comprises a second type of surface treatment arranged to attenuate the RF signal.

2. The array antenna according to claim 1, wherein the first type of surface treatment comprises a primer and metallization.

3. The array antenna according to claim 1, wherein the second type of surface treatment comprises untreated plastics.

4. The array antenna according to claim 1, wherein the second type of surface treatment comprises a primer.

5. The array antenna according to claim 1, wherein the second type of surface treatment comprises metallization, wherein the thickness of the metallization is arranged to attenuate the RF signal.

6. The array antenna according to claim 1, wherein any of the waveguides comprising plastics comprises a glossy plastic.

7. The array antenna according to claim 1, wherein the at least one dummy element is arranged on the perimeter of the plurality of radiation elements.

8. The array antenna according to claim 1, comprising a plurality of columns of radiation elements, wherein at least one column is a dummy column terminated by the attenuation section.

9. The array antenna according to claim 1, wherein the at least one dummy column is arranged on the perimeter of the plurality of columns.

10. The array antenna according to claim 1, wherein the first waveguide is a gap waveguide, and any of the radiation layer and the distribution layer comprises a metamaterial structure arranged to form the gap waveguide intermediate the distribution layer and the radiation layer, the metamaterial structure also arranged to prevent electromagnetic radiation in a frequency band of operation from propagating from the gap waveguide in directions other than through a distribution layer feed and a radiation element.

11. The array antenna according to claim 10, wherein the metamaterial structure comprises a repetitive structure of protruding elements.

12. A telecommunication or radar transceiver comprising the antenna arrangement according to claim 1.

13. A waveguide for guiding a radio frequency, RF, signal, the waveguide comprising metalized plastics, the waveguide further comprising an attenuation section, wherein the attenuation section comprises a second type of surface treatment and the rest of the waveguide comprises a first type of surface treatment, wherein the first type of surface treatment comprises metallization, and the second type of surface treatment is arranged to attenuate the RF signal.

14. The waveguide according to claim 13, comprising a first layer and a second layer, facing each other, wherein any of the first and the second layers comprise a metamaterial structure arranged to form a gap waveguide intermediate the first and the second layers, the metamaterial structure also arranged to prevent electromagnetic radiation in a frequency band of operation from propagating from the gap waveguide in directions other than along an intended waveguiding path.

15. The waveguide according to claim 14, wherein the metamaterial structure comprises a repetitive structure of protruding elements.

16. The waveguide according to claim 13, wherein the first type of surface treatment comprises a primer.

17. The waveguide according to claim 13, wherein the second type of surface treatment comprises untreated plastics.

18. The waveguide according to claim 13, wherein the second type of surface treatment comprises a primer.

19. The waveguide according to claim 13, wherein the second type of surface treatment comprises metallization, and wherein the thickness of the metallization is arranged to attenuate the RF signal.

20. A method for producing a waveguide comprising plastics, the method comprising:

surface treating an attenuation section of the waveguide with a second type of surface treatment; and surface treating the remaining part of the waveguide with a first type of surface treatment, wherein the first type of surface treatment comprises metallization, and the second type of surface treatment is arranged to attenuate the RF signal.

* * * * *